United States Patent [19]

Ishizuka

[11] Patent Number: 5,450,261
[45] Date of Patent: Sep. 12, 1995

[54] MAGNETIC DISC DRIVE MOTOR HAVING DISC SECURELY FIXED TO LOADING SURFACE TO ABUT UPPER BEARING OUTER RING

[75] Inventor: Yutaka Ishizuka, Nagano, Japan

[73] Assignee: Kabushiki Kaisha Sankyo Seiki Seisa Kusho, Nagano, Japan

[21] Appl. No.: 134,635

[22] Filed: Oct. 12, 1993

[30] Foreign Application Priority Data

Oct. 12, 1992 [JP] Japan .................. 4-298212

[51] Int. Cl.$^6$ .................................. G11B 17/028
[52] U.S. Cl. ........................ 360/99.12; 360/99.08
[58] Field of Search ............. 360/99.08, 99.09, 99.11, 360/98.07, 98.08, 99.12; 369/270, 271

[56] References Cited

U.S. PATENT DOCUMENTS

| 4,737,870 | 4/1988 | Okita | 360/99.08 |
| 4,965,476 | 10/1990 | Lin | 360/99.08 |
| 5,128,818 | 7/1992 | Koizumi et al. | 360/99.12 |
| 5,200,866 | 4/1993 | Frugé et al. | 360/99.08 |
| 5,214,326 | 5/1993 | Yonei | 360/99.08 |
| 5,296,981 | 3/1994 | Ogawa | 360/99.08 |

FOREIGN PATENT DOCUMENTS 54-038141 3/1979 Japan .................. 360/98.08

Primary Examiner—Robert S. Tupper
Assistant Examiner—Craig A. Renner
Attorney, Agent, or Firm—Sughrue, Mion, Zinn, Macpeak & Seas

[57] ABSTRACT

A magnetic disc drive motor is provided. It includes a frame, a fixed shaft mounted on the frame upper and lower ball bearings. Inner rings of the upper and lower ball bearings are mounted on the fixed shaft. A rotor is fixed to outer rings of the upper and the lower of the ball bearings. The rotor is provided with a loading surface on an inner portion of its upper surface. The motor also includes a motor member for rotating the rotor disposed between the rotor and the frame. An upper portion of the upper ball bearing projects upward from the loading surface of the rotor and is fitted in the center hole of a magnetic disc, and the inner edge portion of the magnetic disc is fixed to the loading surface of the rotor.

4 Claims, 2 Drawing Sheets

MAGNETIC DISC DRIVE MOTOR HAVING DISC SECURELY FIXED TO LOADING SURFACE TO ABUT UPPER BEARING OUTER RING

BACKGROUND OF THE INVENTION

1. Field of the Invention

This invention relates to a magnetic disc drive motor, and particularly relates to a rotating support device for rotatably supporting a magnetic disc.

2. Related Art

Examples of conventional magnetic disc motors built into hard disc drive devices are shown in FIGS. 3 and 4. In the magnetic disc drive motor shown in FIG. 3, a shaft 2 is mounted in a frame 1, and two ball bearings 3, 3 are mounted on the shaft 2. A hub 4 is mounted on the ball bearings 3, 3. The central portion of the hub 4 is cylindrical, this cylindrical central portion is open at its upper and lower ends, and two magnetic discs 5 are mounted on the outer peripheral surface of this cylindrical central portion. A seal cover 6 covers the opening at the upper end of the hub 4 and is fixed in position there by an adhesive 7.

An armature core 8 is secured on the frame 1, and a drive magnet 9 is mounted on the inner surface of the cylindrical peripheral portion of the hub 4. The armature core 8 has a number of salient poles, and a coil 10 is wound around each of the salient poles. The outer surface of the armature core 8 faces the inner surface of the drive magnet 9 across a radial gap. When the armature core 8 is excited with an electric current it causes the drive magnet 9 to rotate, and the hub 4 rotates integrally with the drive magnet 9.

In the magnetic disc drive motor shown in FIG. 4, in order to make the device smaller and thinner, the motor is housed right inside the hub on which the magnetic discs are loaded. A cylindrical support 12 is formed in the central part of a frame 11, and two ball bearings 13, 13 are mounted on the inner surface of this support 12. A shaft portion 15, integral with the hub 14, is rotatably mounted in the bearings 13, 13. The magnetic discs 5 are mounted on the outside of the hub 14.

An armature core 16 is mounted on the outer surface of the support 12 of the frame 11, a drive magnet 17 is mounted on the inner surface of the hub 14, the armature core 16 and the drive magnet 17 and other parts form a motor, this motor rotates the drive magnet 17 so as to rotate the hub 4 together with the drive magnet 17.

In the conventional magnetic disc drive motors described above, because they incorporate the hub 4 for carrying the magnetic discs 5, the precision of coupling the hub 4 with the ball bearings 3 and the precision of machining the hub 4 directly affect the precision with which the magnetic discs 5 rotate, and the precision with which the magnetic discs 5 rotate is therefore impaired. Also, because the diametral thickness of the hub 4 has to be accommodated, there is the problem that it is difficult to reduce the size of the motor, and, in particular, when high density magnetic discs 5 which are both of small diameter and capable of high density recording are used, because the diameters of the shaft 2 and the ball bearings 3 have to be made small, problems such as shaft deflection occur, and the practical application of these high performance discs is difficult.

SUMMARY OF THE INVENTION

This invention was devised as a solution to these kinds of problem, and aims to provide a magnetic disc drive motor which has a simple and compact construction and with which highly precise rotation can be achieved.

According to the aspect of the present invention, there is provided a magnetic disc drive motor, comprising: a frame; a fixed shaft mounted on the frame; upper and lower ball bearings, inner rings of the upper and lower ball bearings being mounted on the fixed shaft; a rotor fixed to outer rings of the upper and the lower of the ball bearings, the rotor being provided with a loading surface on an inner portion of its upper surface; and a motor member for rotating the rotor, the motor being disposed between the rotor and the frame, wherein an upper portion of the upper ball bearing projects upward from the loading surface of the rotor and is fitted in the center hole of a magnetic disc, and the inner edge portion of the magnetic disc is fixed to the loading surface of the rotor.

According to this invention, because the upper portion of the upper ball bearing mounted on the fixed shaft is made to project upward from the loading surface of the rotor, and because no hub such as conventionally is required is interposed between the magnetic disc and the bearings, and the magnetic disc is mounted with its inner edge fitted in direct contact with the projecting portion of the outer ring of the upper ball bearing and with its inner edge portion loaded on the loading surface of the rotor, the magnetic disc can be rotated with a high degree of precision on high precision ball bearings without being affected by the precision of the fit between any hub and the ball bearings or the precision with which any hub is machined, and because circumferential shake components particularly are reduced, the realization of high capacity disc drives is made easy.

Furthermore, because the hub is dispensed with and a diametrally thick hub is no longer interposed between the bearings and the magnetic discs, magnetic discs having small center holes can be used, and when magnetic discs having regular sized center holes are used the diameter of the fixed shaft can be increased and therefore the strength and vibration resistance of the shaft can be increased. And, because the hub that has conventionally been used is no longer needed, the size of the device can be reduced by an amount corresponding to the thickness of the hub, the motor can therefore easily be made smaller, and the cost of the hub can be saved.

DETAILED DESCRIPTION OF PREFERRED EMBODIMENTS

Figure 1:
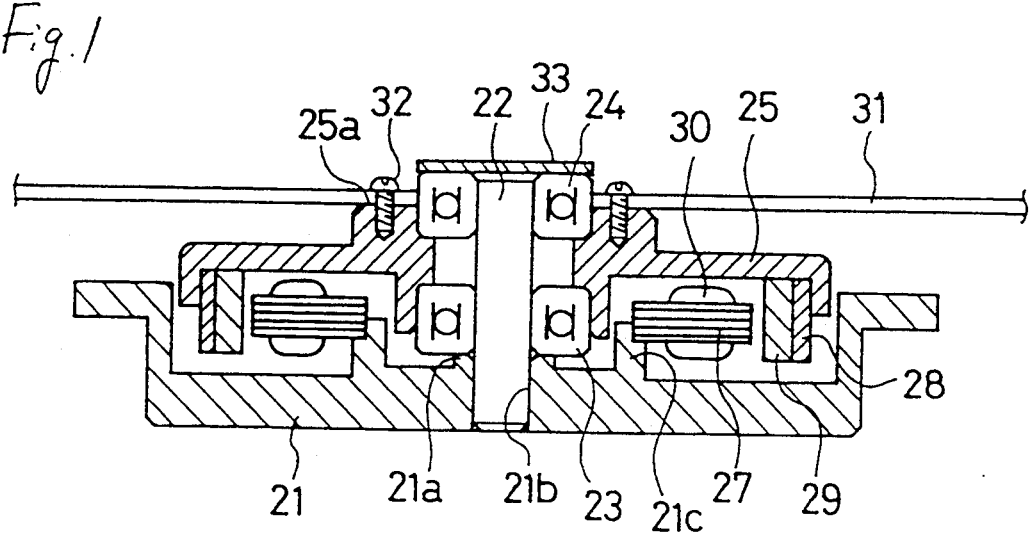
FIG. 1 is a cross-sectional view of a magnetic disc drive motor constructed according to a first preferred embodiment of the present invention.

A first preferred embodiment of a magnetic disc drive motor according to the present invention will now be described, with reference to the accompanying drawings. In FIG. 1, a boss portion 21a projects up from the central portion of a frame 21, and a cylindrical fixed shaft 22 is mounted vertically in an axial center hole 21b formed in the boss portion 21a. This fixed shaft 22 does not have to be a separate member from the frame 21, as it is in FIG. 1, and can instead be formed as an integral part of the frame 21 projecting vertically upward from the central portion of the frame 21. A lower ball bearing 23 and an upper ball bearing 24 are mounted on the fixed shaft 22. The inner ring of the lower ball bearing 23 is brought into contact with the upper end surface of the boss portion 21a.

The central portion of a generally plate-shaped rotor 25 is fixedly secured on the outer rings of the upper and lower ball bearings 23 and 24, and the rotor 25 is thereby rotatably mounted on the fixed shaft 22. A loading surface 25a is formed in a plane perpendicular to the fixed shaft 22 on the upper surface of the inner portion of the rotor 25. At least the upper half of the upper ball bearing 24 projects upward from the loading surface 25a of the rotor 25, and, as will be described hereinafter, a magnetic disc is fitted onto this projecting portion.

When the inner rings of the lower ball bearing 23 and the upper ball bearing 24 are being fitted onto the fixed shaft 22, respectively, the inner rings are fixed to the shaft 22 with adhesive or the like while a suitable downward pressure is applied to the inner ring of the upper ball bearing 24. In this way, the ball bearings 23 and 24 are both provided with a pre-load.

The frame 21 is generally plate-shaped, and the rotor 25 is also generally plate-shaped, and the frame 21 and the rotor 25 are mounted with their concave portions facing each other and their generally cylindrical peripheral portions mating together, with a small radial gap provided between the two so that the rotor 25 can rotate with respect to the frame 21. A circular projection 21c is formed on the frame 21 on the outer side of the boss portion 21a, and the inner surface of an armature core 27 is fixed to this circular projection 21c. The armature core 27 has a number of salient poles on its outer side, and a coil 30 is wound around each of the salient poles. A drive magnet 29 is mounted on a back yoke 28 consisting of a magnetic body such as a steel plate, and the back yoke 28 is mounted on the inner surface of the cylindrical peripheral portion of the rotor 25. The outer surface of the armature core 27 and the inner surface of the drive magnet 29 face each other across a fixed radial gap. The armature core 27 and the coils 30, and the drive magnet 29 and other parts make up a motor section, and this motor section is positioned in the space formed between the frame 21 and the rotor 25. The motor section rotates the drive magnet 29, and the rotor 25 and the outer rings of the ball bearings 23 and 24 rotate together with the drive magnet 29.

A magnetic disc 31 is mounted on the outer ring of the upper ball bearing 24, i.e. the outer ring of the upper ball bearing 24 is fitted in the center hole of the magnetic disc 31, and the inner peripheral portion of the magnetic disc 31 is mounted on the loading surface of the rotor 25. The magnetic disc 31 is provided with through holes in its inner edge portion, the rotor 25 is provided with threaded holes in its loading surface 25a, and the magnetic disc 31 is fixed onto the loading surface 25a by screws 32.

A plate-form sealing member 33 is fixed by adhesive or other suitable means to the upper end of the outer ring of the upper ball bearing 24 in such a way that there is a gap between the sealing member 33 and the inner ring and the sealing member therefore does not make contact with the inner ring. This sealing ring prevents lubricating oil from inside the ball bearings 23 and 24 from getting out in oil mist or dust form onto the recording surface of the magnetic disc 31. In some cases, lubricating oil from the lower ball bearing 23, which is located in the space between the frame 21 and the rotor 25, might get sprayed to the outside in dust form through the radial gap between the cylindrical peripheral portions of the frame 21 and the rotor 25; to prevent this, a labyrinth seal can be provided at this gap.

Figure 2:
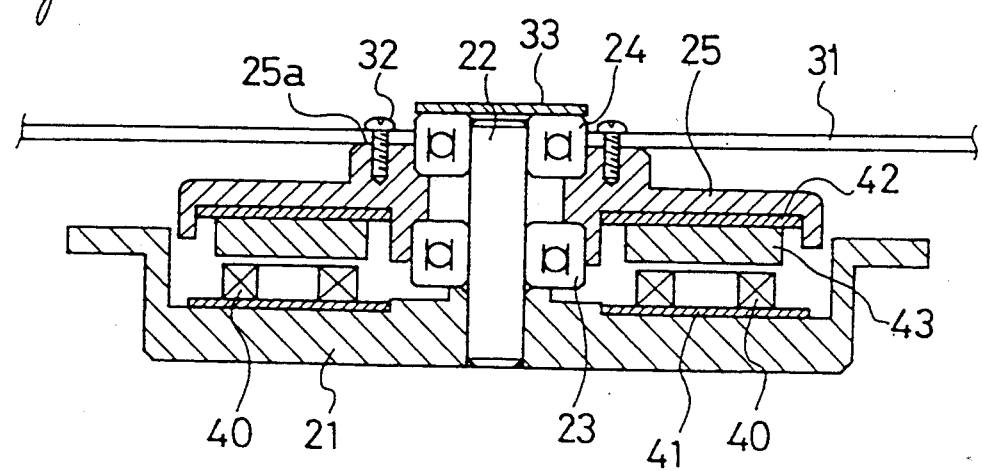
FIG. 2 is a cross-sectional view of a second preferred embodiment.
Figure 3:
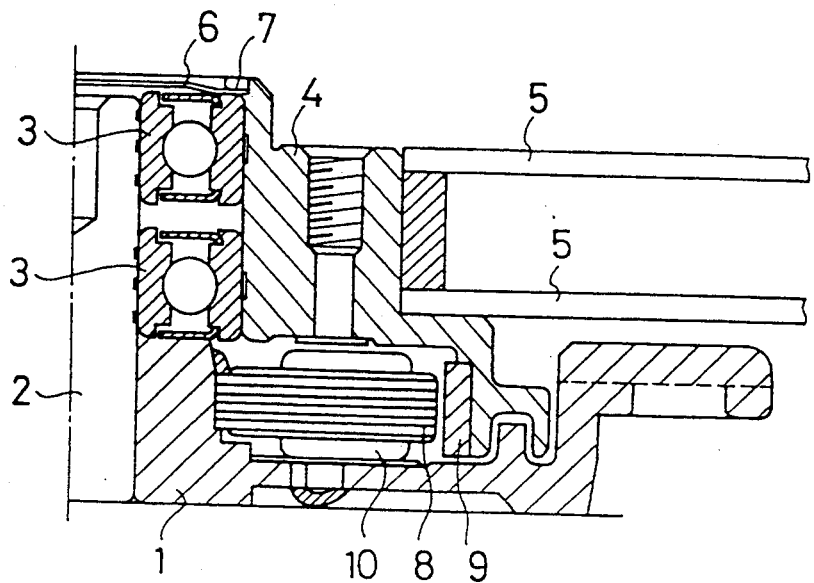
FIG. 3 is a cross-sectional view of a conventional magnetic disc drive motor.
Figure 4:
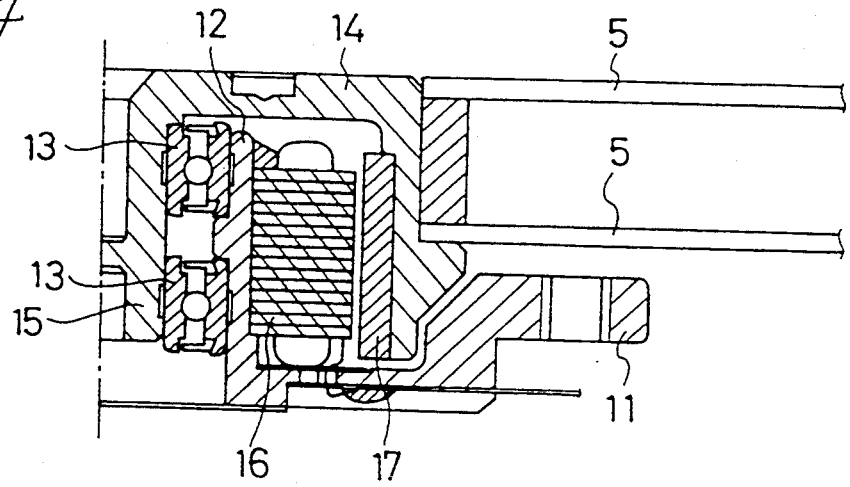
FIG. 4 is a cross-sectional view of another conventional magnetic disc drive motor.

A second preferred embodiment of a magnetic disc drive according to the present invention is shown in FIG. 2. In this second preferred embodiment, the motor section is constructed in such a way that the gap between the rotor magnet and the stator magnet exists in axial direction. A number of armature coils 40, divided into for example three phases, are arrayed in a circle about the fixed shaft 22 on a stator base 41 mounted on the floor of the frame 21. A donut-shaped drive magnet 43 is mounted on a back yoke 42 consisting of a magnetic body such as a steel plate and mounted on the underside of the rotor 25. The drive magnet 43 and the armature coils 40 face each other across a flat axial gap, and when the armature coils 40 are excited by an electric current they rotate the drive magnet 43. The rotor 25 and the outer rings of the bearings 23 and 24 rotate integrally with the drive magnet 43. Apart from the motor section described above this second preferred embodiment is identical in construction to the first preferred embodiment, and therefore a description here of the rest of the construction of the second preferred embodiment will be omitted.

It should be noted that various changes can be made to the constructions described above without exceeding the scope of the present invention. For example, in the first and second preferred embodiments described above, the magnetic disc is fixed to the loading surface of the rotor by means of screws, but fixing means other than screws can be used for this purpose instead. And the rotor can be fixed to just the lower end surface of the upper ball bearing, so that not just the upper portion but the whole of the upper ball bearing projects upward from the loading surface on the rotor.

As is clear from the above description, with a magnetic disc drive motor according to this invention, because the upper portion of the upper ball bearing mounted on the fixed shaft is made to project upward from the loading surface of the rotor, and because no hub such as conventionally is required is interposed between the magnetic disc and the bearings, and the magnetic disc is mounted with its inner edge fitted in direct contact with the projecting portion of the outer ring of the upper ball bearing and with its inner edge portion loaded on the loading surface of the rotor, the magnetic disc can be rotated with a high degree of precision on high precision ball bearings without being affected by the precision of the fit between any hub and the ball bearings or the precision with which any hub is machined, and because circumferential shake components particularly are reduced, the realization of high capacity disc drives is made easy.

Furthermore, because the hub is dispensed with and a diametrally thick hub is no longer interposed between the bearings and the magnetic discs, magnetic discs having small center holes can be used, and when magnetic discs having regular sized center holes are used the diameter of the fixed shaft can be increased and therefore the strength and vibration resistance of the shaft can be increased. And, because the hub that has conventionally been used is no longer needed, the size of the device can be reduced by an amount corresponding to the thickness of the hub, the motor can therefore easily be made smaller, and the cost of the hub can be saved.

What is claimed is:

1. A magnetic disc drive motor, comprising:
a frame;
a fixed shaft mounted on the frame;
upper and lower ball bearings, inner rings of the upper and lower ball bearings being mounted on the fixed shaft;
a rotor fixed to outer rings of the upper and the lower of the ball bearings, the rotor being provided with a magnetic disc loading surface on an upper surface thereof immediately adjacent the outer ring of the upper ball bearing; and
a motor member for rotating the rotor, the motor member being disposed between the rotor and the frame,
wherein an upper portion of the upper ball bearing abuts and projects upward from and perpendicular to the loading surface of the rotor and is fitted in a center hole of a magnetic disc, and an inner edge portion of the magnetic disc is securely fixed to the loading surface of the rotor and abuts the outer ring of the upper ball bearing.

2. A magnetic disc drive motor as claimed in claim 1, wherein the magnetic disc is fixed in position by fixing means including screws.

3. A magnetic disc drive motor as claimed in claim 2, wherein the rotor and the frame are substantially plate-shaped and have facing opening portions, respectively, the magnetic disc drive motor further comprising a drive magnet mounted on an inner peripheral portion of the rotor and an armature core mounted on the frame, said drive magnet and said armature core facing each other in a gap defined between the frame and the rotor.

4. A magnetic disc drive motor as claimed in claim 1, wherein the rotor and the frame are substantially plate-shaped and have facing opening portions, respectively, the magnetic disc drive motor further comprising a stator base having a plurality of armature coils mounted thereon, said stator base being fixed to the frame; and a drive magnet mounted on an inner peripheral portion of the rotor, said drive magnet and said armature coils facing each other with a predetermined gap in an axial direction thereof.

* * * * *